(12) United States Patent
Lee et al.

(10) Patent No.: US 10,393,876 B2
(45) Date of Patent: Aug. 27, 2019

(54) CAMERA DEVICE

(71) Applicant: LG INNOTEK CO., LTD., Seoul (KR)

(72) Inventors: Sang Hyun Lee, Seoul (KR); Gi Seok Lee, Seoul (KR); Se Kyu Lee, Seoul (KR); Sung Ki Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 407 days.

(21) Appl. No.: 15/115,189

(22) PCT Filed: Jan. 28, 2015

(86) PCT No.: PCT/KR2015/000913
§ 371 (c)(1),
(2) Date: Jul. 28, 2016

(87) PCT Pub. No.: WO2015/115799
PCT Pub. Date: Aug. 6, 2015

(65) Prior Publication Data
US 2016/0349370 A1    Dec. 1, 2016

(30) Foreign Application Priority Data

Jan. 29, 2014 (KR) .................. 10-2014-0011591

(51) Int. Cl.
*G01C 3/08* (2006.01)
*G01S 17/89* (2006.01)
(Continued)

(52) U.S. Cl.
CPC ............ *G01S 17/89* (2013.01); *G01S 7/4814* (2013.01); *G01S 7/4817* (2013.01); *G01S 17/10* (2013.01);
(Continued)

(58) Field of Classification Search
CPC ........ G01S 17/89; G01S 17/10; G01S 7/4814; G01S 7/4817; H04N 13/271; G02B 3/14
(Continued)

(56) References Cited

U.S. PATENT DOCUMENTS

2007/0296950 A1    12/2007  Sakagami et al.
2008/0123479 A1    5/2008   Kim
(Continued)

FOREIGN PATENT DOCUMENTS

JP    2008-32427 A    2/2008
JP    2009-204691 A   9/2009
(Continued)

*Primary Examiner* — Mark Hellner
(74) *Attorney, Agent, or Firm* — Birch, Stewart, Kolasch & Birch, LLP

(57) ABSTRACT

A camera device according to one embodiment of the present invention comprises: a light output unit that outputs IR (infrared) light; a light input unit including a plurality of pixels respectively having a first receiving unit and a second receiving unit, and having light that is reflected by an object and input therein after the light is output from the light output unit; and a calculating unit that calculates the distance to the object by using the difference in the amount of light input to the first receiving unit and the second receiving unit of the light input unit. The camera device further comprises a first lens and a second lens disposed between the light output unit and the object, wherein the first lens refracts the light output from the light output unit in a first direction, and the second lens refracts the light output from the light output unit in a second direction.

13 Claims, 6 Drawing Sheets

(51) Int. Cl.
   *H04N 13/271*   (2018.01)
   *G01S 7/481*    (2006.01)
   *H04N 5/235*    (2006.01)
   *G01S 17/10*    (2006.01)
   *G02B 3/14*     (2006.01)

(52) U.S. Cl.
   CPC .............. *G02B 3/14* (2013.01); *H04N 5/2357* (2013.01); *H04N 13/271* (2018.05)

(58) Field of Classification Search
   USPC ........................................................ 356/5.01
   See application file for complete search history.

(56) References Cited

U.S. PATENT DOCUMENTS

| | | |
|---|---|---|
| 2010/0091389 A1 | 4/2010 | Henriksen et al. |
| 2014/0078459 A1 | 3/2014 | Kim et al. |
| 2014/0092219 A1 | 4/2014 | Drazic et al. |
| 2015/0001664 A1* | 1/2015 | Van Der Tempel ........................ H01L 27/14612 257/432 |

FOREIGN PATENT DOCUMENTS

| | | |
|---|---|---|
| JP | 2009-276243 A | 11/2009 |
| JP | 2010-14903 A | 1/2010 |
| JP | 2012-168049 A | 9/2012 |
| KR | 10-2008-0047125 A | 5/2008 |
| KR | 10-2012-0046042 A | 5/2012 |
| KR | 10-2012-0056441 A | 6/2012 |
| KR | 10-2013-0075700 A | 7/2013 |

\* cited by examiner

CAMERA DEVICE

CROSS REFERENCE TO RELATED APPLICATIONS

This application is the National Phase of PCT International Application No. PCT/KR2015/000913, filed on Jan. 28, 2015, which claims priority under 35 U.S.C. 119(a) to Patent Application No. 10-2014-0011591, filed in Republic of Korea on Jan. 29, 2014, all of which are hereby expressly incorporated by reference into the present application.

TECHNICAL FIELD

The present disclosure relates to a camera device, and more particularly, to depth information extraction of a time-of-flight (TOF) camera.

BACKGROUND ART

A technology of acquiring a three-dimensional image using a capturing device is advancing. Depth information (depth map) is required for acquiring a three-dimensional image. Depth information is information that indicates a spatial distance and shows perspective information of a point with respect to another point in a two-dimensional image.

A method in which infrared (IR) structured light is projected to an object and light reflected from the object is interpreted to extract depth information is one of the methods of acquiring depth information. According to the method using the IR structured light, there is a problem in that it is difficult to obtain a desired level of depth resolution for a moving object.

A time-of-flight (TOF) method is gaining attention as a technology for substituting the method using IR structured light. According to the TOF method, a distance from an object is calculated by measuring a flight time, i.e., a time taken for emitted light to be reflected.

Generally, a camera according to the TOF method (hereinafter, a TOF camera) includes a scanner that adjusts the angle of light directed toward an object and a mirror that adjusts the optical path. Since light has to be reflected multiple times in the TOF camera, there are problems in that the structure is complicated and implementing in a small size is difficult. In addition, although a refractive index of light output from a light source has to be adjusted with a rapid response speed for the scanner to scan a front surface of an object, there is a technical limitation for the scanner to have a rapid response speed.

DISCLOSURE

Technical Problem

The present disclosure is directed to providing a TOF camera device that extracts depth information.

Technical Solution

According to an embodiment of the present disclosure, a camera device includes a light output unit that outputs IR (infrared) light, a light input unit that includes a plurality of pixels, each having a first receiving unit and a second receiving unit, and is input with light output from the light output unit and then reflected from an object, and a calculating unit that calculates a distance from the object using a difference in the amounts of light input to the first receiving unit and the second receiving unit of the light input unit, wherein the camera device may further include a first lens that refracts light output from the light output unit in a first direction and a second lens that refracts light output from the light output unit in a second direction, which are disposed between the light output unit and the object.

The camera device may further include a power source unit that applies voltages to the first lens and the second lens.

Different voltages may be applied to the first lens and the second lens.

At least one of the first lens and the second lens may include a glass substrate, a polymer arranged on the glass substrate, a glass film arranged on the polymer, and a piezoelectric element arranged on the glass film.

The power source may be connected to the piezoelectric element.

The shape of the polymer may change according to a voltage applied to the piezoelectric element, and at least one of a refractive index and a refracting direction of a lens may change according to the shape of the polymer.

The first direction and the second direction may form an angle of 90°.

The first receiving unit may be activated while a light source is turned on, and the second receiving unit may be activated while the light source is turned off.

The camera device may further include a light transmission member arranged between the light output unit and the first lens to transmit light output from the light output unit to the first lens.

According to an embodiment of the present disclosure, a camera device includes a light output unit that outputs IR (infrared) light, a light input unit that is input with light output from the light output unit and then reflected from an object, and a calculating unit that calculates a distance from the object using an amount of light input into the light input unit, wherein the camera device may further include a plurality of lenses sequentially arranged between the light output unit and the object, and at least one of refractive indexes and refracting directions of the plurality of lenses may be adjusted to be different from each other according to a voltage applied to each of the plurality of lens.

The plurality of lenses may include a tunable lens.

The plurality of lenses may be fixed at predetermined intervals in a lens holder.

Advantageous Effects

According to an embodiment of the present disclosure, a TOF camera can be simply implemented in a small size, and mass production can be improved due to easy assembly. In addition, depth information can be precisely extracted due to high optical efficiency, and power consumption can be reduced. Particularly, a front surface of an object can be irradiated with light at a rapid speed even without using a scanner.

MODES OF THE INVENTION

Figure 1:
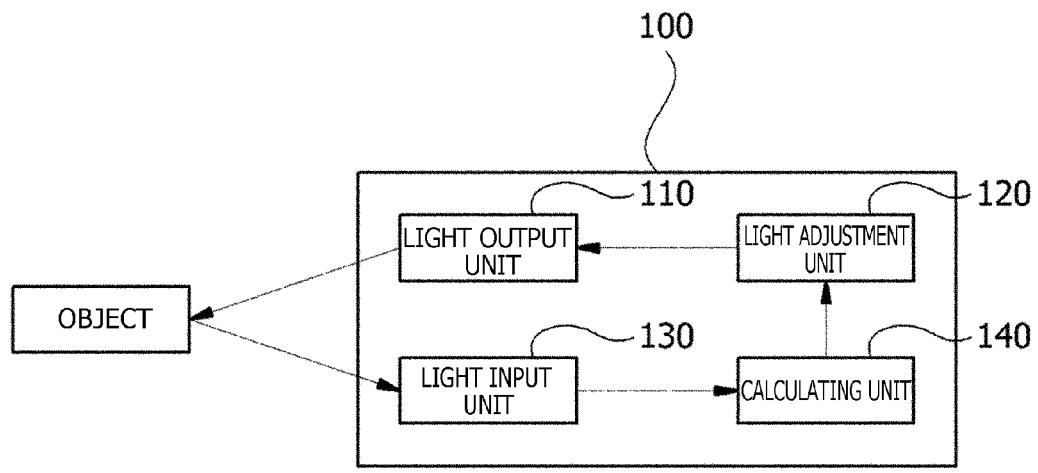
FIG. 1 is a block diagram of a TOF camera device according to an embodiment of the present disclosure.

Since various modifications may be made to the present disclosure and the present disclosure may have various embodiments, particular embodiments will be illustrated in the drawings and described. However, this does not limit the present disclosure to the particular embodiments, and all modifications, equivalents, and substitutes included within the spirit and scope of the present disclosure should be construed as belonging to the present disclosure.

Terms including ordinals such as first and second may be used to describe various elements, but the elements are not limited by the terms. The terms are only used for the purpose of distinguishing one element from another element. For example, a second element may be referred to as a first element while not departing from the scope of the present disclosure, and likewise, a first element may also be referred to as a second element. The term and/or includes a combination of a plurality of related described items or any one item among the plurality of related described items.

When it is mentioned that a certain element is "connected" or "linked" to another element, although the certain element may be directly connected or linked to the other element, it should be understood that another element may exist therebetween. On the other hand, when it is mentioned that a certain element is "directly connected" or "directly linked" to another element, it should be understood that other elements do not exist therebetween.

Terms used in the application are merely used to describe particular embodiments and are not intended to limit the present disclosure. A singular expression includes a plural expression unless the context clearly indicates otherwise. In the application, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Unless otherwise defined, all terms including technical or scientific terms used herein have the same meaning as commonly understood by one of ordinary skill in the art to which the disclosure pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, an embodiment will be described in detail with reference to the accompanying drawings while like reference numerals will be given to the same or corresponding elements regardless of signs in the drawings and overlapping descriptions thereof will be omitted.

Figure 2:
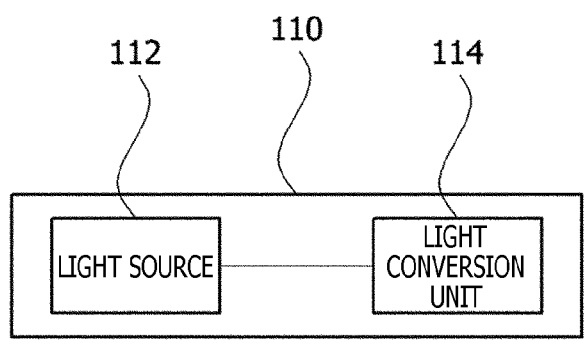
FIG. 2 is a block diagram of a light output unit of a TOF camera device according to an embodiment of the present disclosure.
Figure 3:
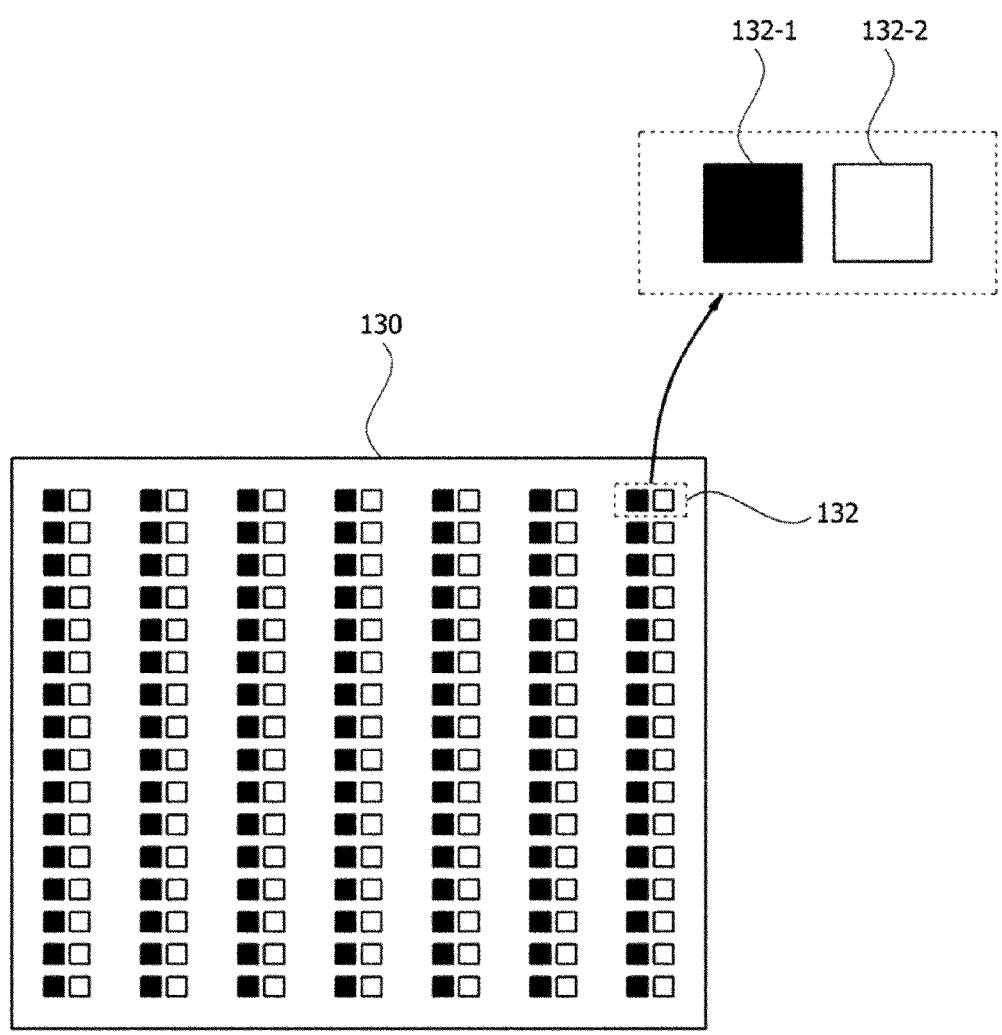
FIG. 3 illustrates a structure of a light input unit of a TOF camera device according to an embodiment of the present disclosure.
Figure 4:
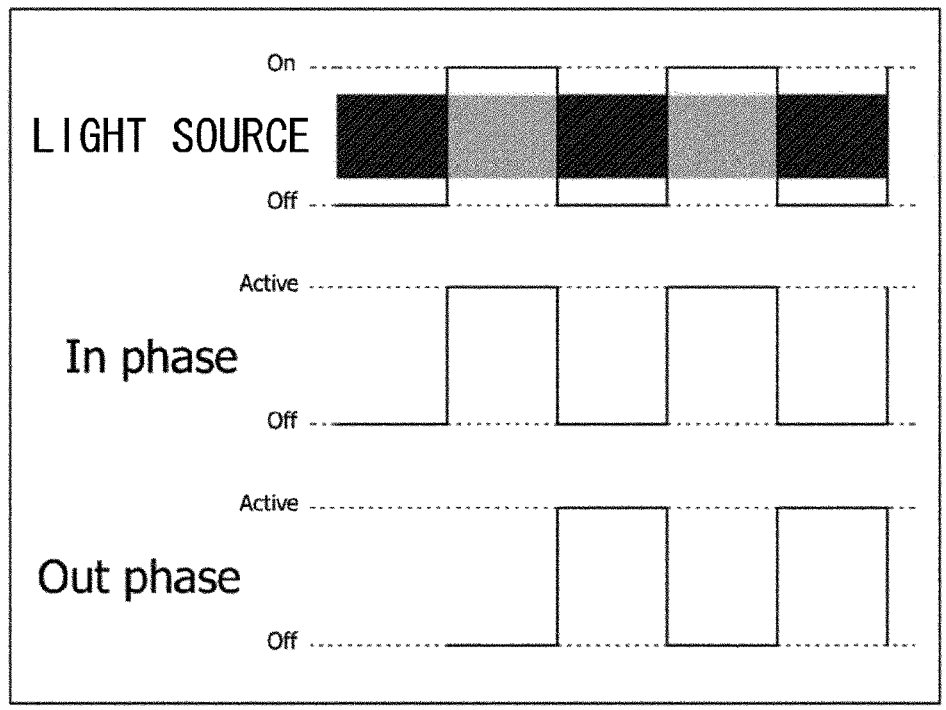
FIG. 4 is a view for describing a method of calculating a distance from an object by a calculating unit of a TOF device according to an embodiment of the present disclosure.

FIG. 1 is a block diagram of a TOF camera device according to an embodiment of the present disclosure, FIG. 2 is a block diagram of a light output unit of a TOF camera device according to an embodiment of the present disclosure, FIG. 3 illustrates a structure of a light input unit of a TOF camera device according to an embodiment of the present disclosure, and FIG. 4 is a view for describing a method of calculating a distance from an object by a calculating unit of a TOF device according to an embodiment of the present disclosure.

Referring to FIG. 1, a TOF camera device 100 includes a light output unit 110, a light adjustment unit 120, a light input unit 130, and a calculating unit 140.

The light output unit 110 outputs infrared (IR) light. The IR light may be, for example, light having a wavelength band that is 800 nm or higher. Referring to FIG. 2, the light output unit 110 includes a light source 112 and a light conversion unit 114. The light source may include at least one laser diode (LD) or light emitting diode (LED) that projects infrared rays. Also, the light conversion unit 114 may modulate light output from the light source 112. The light conversion unit 114 may, for example, perform a pulse modulation or a phase modulation of the light output from the light source 112. Accordingly, the light output unit 110 may output light while causing the light source to flicker at every predetermined interval.

Referring again to FIG. 1, the light adjustment unit 120 adjusts the angle of light so that the light output from the light output unit 110 is radiated toward a front surface of an object.

Meanwhile, the light input unit 130 is input with light output from the light output unit 110 and then reflected by the object. The light input unit 130 may convert the input light into an electrical signal. The light input unit 130 may be an image sensor including a photo diode (PD) or a complementary metal-oxide semiconductor (CMOS).

Referring to FIG. 3, the light input unit 130 includes a plurality of pixels 132 that are arranged. Each pixel may include an in-phase reception unit 132-1 and an out-phase reception unit 132-2. Referring to FIG. 4, the in-phase reception unit 132-1 may be activated while a light source is turned on, and the out-phase reception unit 132-2 may be activated while the light source is turned off. In this way, when the in-phase reception unit 132-1 and the out-phase reception unit 132-2 are activated with a time difference, a difference occurs in the amount of light received according to the distance from an object. For example, when the object is right in front of the TOF camera device (i.e., when distance=0), the time taken for light output from the light output unit 110 to be reflected is 0 such that a flickering cycle of a light source becomes a light reception cycle without change. Accordingly, only the in-phase reception unit 132-1 receives light, and the out-phase reception unit 132-2 does not receive light. In another example, when the object is spaced a predetermined distance away from the TOF camera device, time is taken for light output from the light output unit 110 to be reflected such that the flickering cycle of the light source becomes different from the light reception cycle. Accordingly, a difference occurs between amounts of light received by the in-phase reception unit 132-1 and the out-phase reception unit 132-2.

Referring again to FIG. 1, the calculating unit 140 calculates a distance from an object using a difference between amounts of light input into the in-phase reception unit 132-1 and the out-phase reception unit 132-2.

Generally, the light adjustment unit 120 may include a scanner that adjusts the angle of light radiated toward an object. Light output from a light source may reach the scanner, and the light may be radiated toward a front surface of an object according to the rotation of the scanner. The light radiated from the object may be reflected by the scanner and then input again into the light input unit 130. Meanwhile, an actuator may be connected to the scanner, and the scanner may be rotated by the actuator. Here, the actuator may include a microelectromechanical system (MEMS). The MEMS refers to a system in which a mechanical structure at a micro-level and an electronic circuit are integrated. According to an embodiment of the present disclosure, the MEMS actuator may finely adjust the angle of light that scans an object using an electrical signal.

In this way, when the TOF camera device includes the scanner, the number of parts increases, and it becomes difficult to implement the device in a small size.

According to an embodiment of the present disclosure, the light adjustment unit of the TOF camera device includes two or more lenses arranged between the light source and the object to refract light. Accordingly, the light output from the light source may be radiated toward the front surface of the object even without the scanner.

Figure 5:
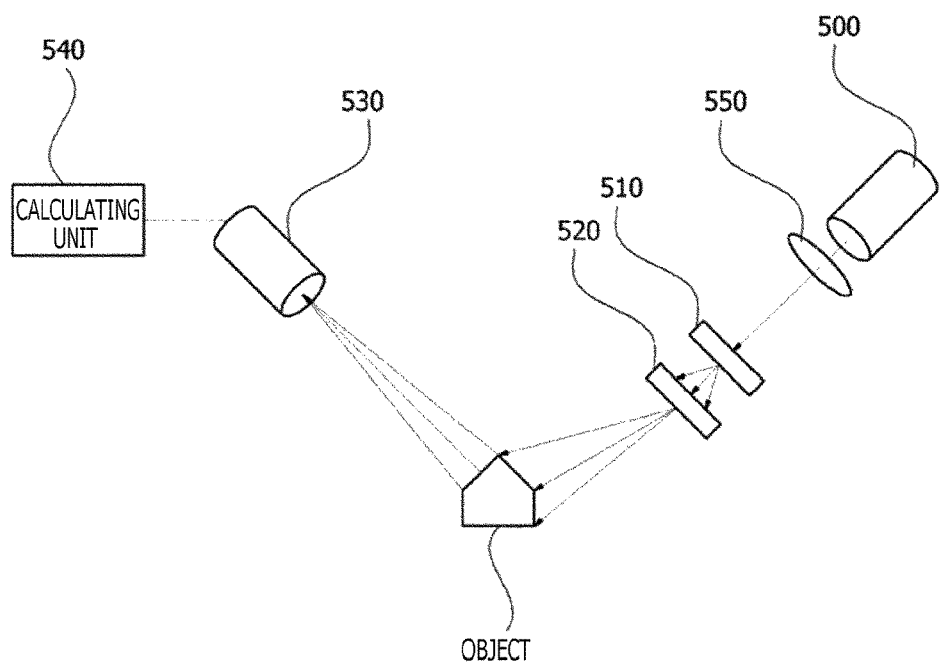
FIG. 5 illustrates a TOF device according to an embodiment of the present disclosure.

FIG. 5 illustrates a TOF device according to an embodiment of the present disclosure.

Referring to FIG. 5, a light source 500 outputs IR light. The output IR light may be light that is pulse-modulated or phase-modulated in the light conversion unit. The light source 500 may include, for example, a laser diode (LD) that outputs light with a short wavelength, a light emitting diode (LED), an LED having a multi-cell structure, etc.

The IR light output from the light source 500 is refracted in a first direction by passing through a first lens 510. Also, the light that has passed through the first lens 510 is refracted in a second direction by passing through a second lens 520. Here, the first lens 510 and the second lens 520 may be arranged on an optical axis of the IR light output from the light source 500. The first lens 510 and the second lens 520 may be sequentially arranged between the light source 500 and the object. For this, the first lens 510 and the second lens 520 may be fixed with a predetermined interval in a lens holder, and the center of the lens holder and the center of the light source may be placed on a straight line. The light source 500, the first lens 510, and the second lens 520 may also be sequentially accommodated with predetermined intervals in one holder.

In addition, the first direction and the second direction may be directions different from each other. For example, when the first direction is the x-axis direction, the second direction may be the y-axis direction. Accordingly, light that has passed through the first lens 510 and the second lens 520 may be radiated to both an x-axis line and a y-axis line of a screen.

Here, a power source may be connected to the first lens 510 and the second lens 520, and the power source may apply a voltage to each of the first lens 510 and the second lens 520. The voltages applied to the first lens 510 and the second lens 520 may adjust at least one of refractive indexes and refracting directions of the first lens 510 and the second lens 520. That is, different voltages may be applied to the first lens 510 and the second lens 520 to adjust a refractive index and a refracting direction of light. For this, at least one of the first lens 510 and the second lens 520 may be a tunable (T) lens.

The light radiated to the front surface of the object is reflected from the object and reaches a light input unit 530. The light input unit 530 may include, for example, a photo diode (PD). The light that has reached the light input unit 530 is converted into an electrical signal, and a calculating unit 540 uses the converted electrical signal to calculate a distance from the object.

Meanwhile, a light transmission member 550 that transmits IR light output from the light source 500 to the first lens 510 may be further disposed between the light source 500 and the first lens 510. The light transmission member may be, for example, a condensing lens.

Figure 6:
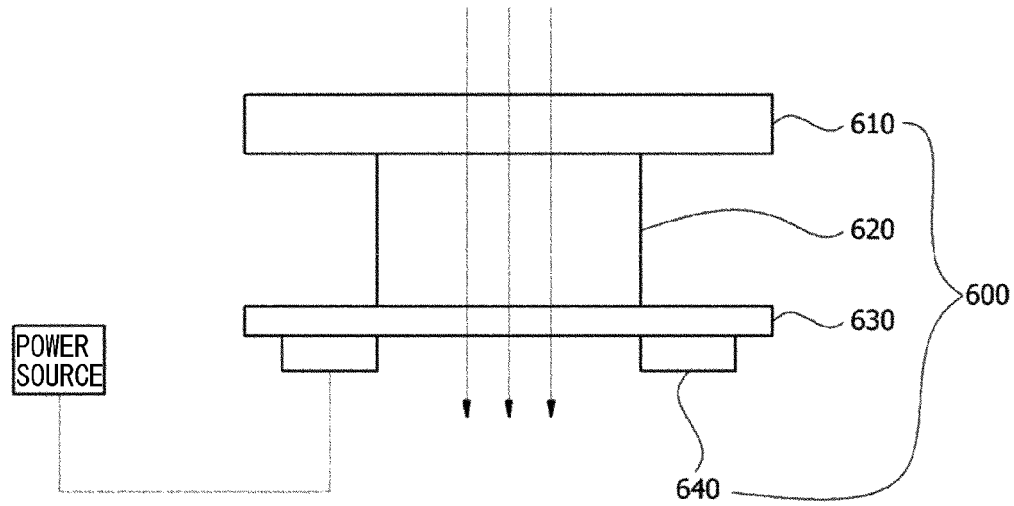
FIGS. 6 and 7 are cross-sectional views of a lens included in a TOF camera device according to an embodiment of the present disclosure.
Figure 7:
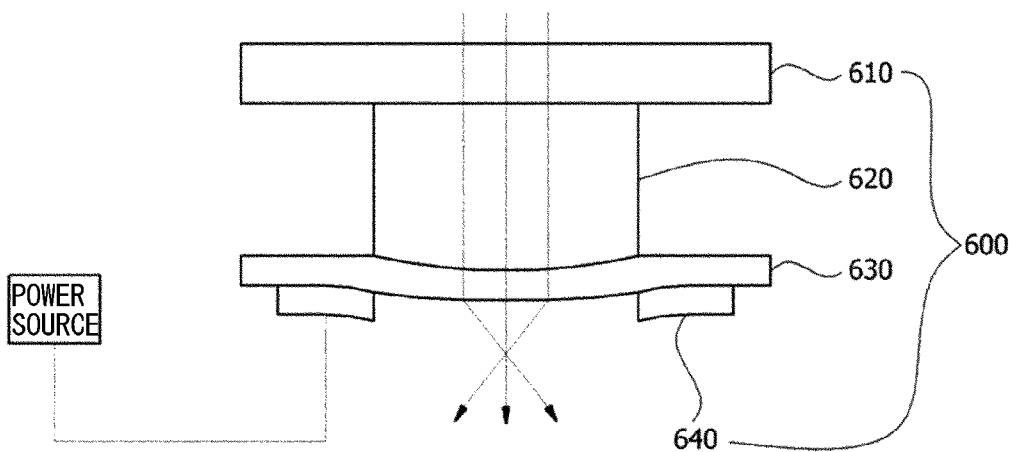

FIGS. 6 and 7 are cross-sectional views of a lens included in a TOF camera device according to an embodiment of the present disclosure. FIG. 6 illustrates a state in which a voltage is not applied to the lens, and FIG. 7 illustrates a state in which a voltage is applied to the lens. In addition, FIGS. 8 and 9 illustrate voltages respectively applied to the two lenses included in a TOF camera device according to an embodiment of the present disclosure, and FIG. 10 is a view for describing scanning in the x-axis direction and the y-axis direction due to different voltages applied to the two lenses included in the TOF camera device.

Referring to FIGS. 6 and 7, a lens 600 included in a TOF camera device according to an embodiment of the present disclosure includes a glass substrate 610, a polymer 620 disposed at one surface of the glass substrate, a glass film 630 disposed at one surface of the polymer, and a piezoelectric film 640 disposed at one surface of the glass film. The piezoelectric film may be, for example, a piezo-film.

In addition, a power source is connected to the piezoelectric film 640. When a voltage is applied to the piezoelectric film 640, a pressure is applied to the piezoelectric film 640, and the shape of the polymer 620 may be deformed. The thickness, the shape, etc. of the polymer 620 may change according to the size of the voltage applied to the piezoelectric film 640, and a refractive index and a refracting direction of light passing through the lens may change according to the thickness, the shape, etc. of the polymer 620. The lens 600 may be, for example, a tunable lens.

Figure 8:
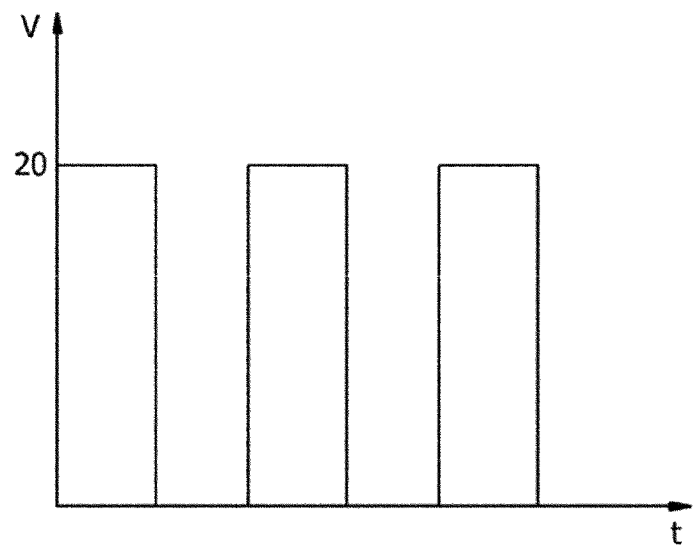
FIGS. 8 and 9 illustrate voltages respectively applied to two lenses included in a TOF camera device according to an embodiment of the present disclosure.
Figure 9:
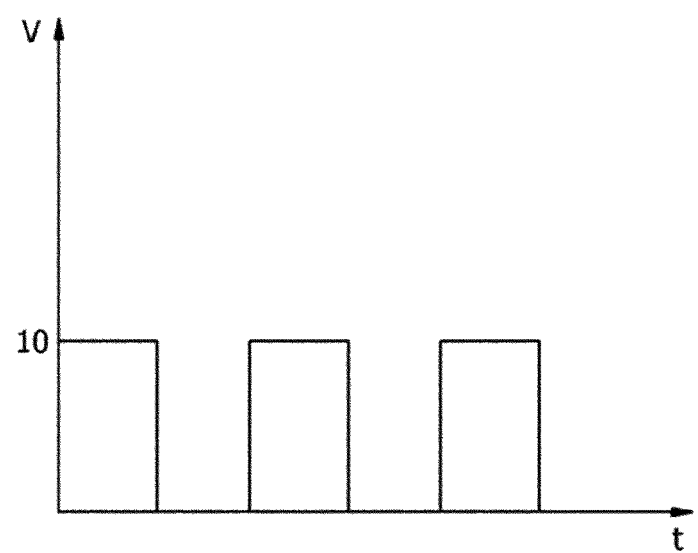
Figure 10:
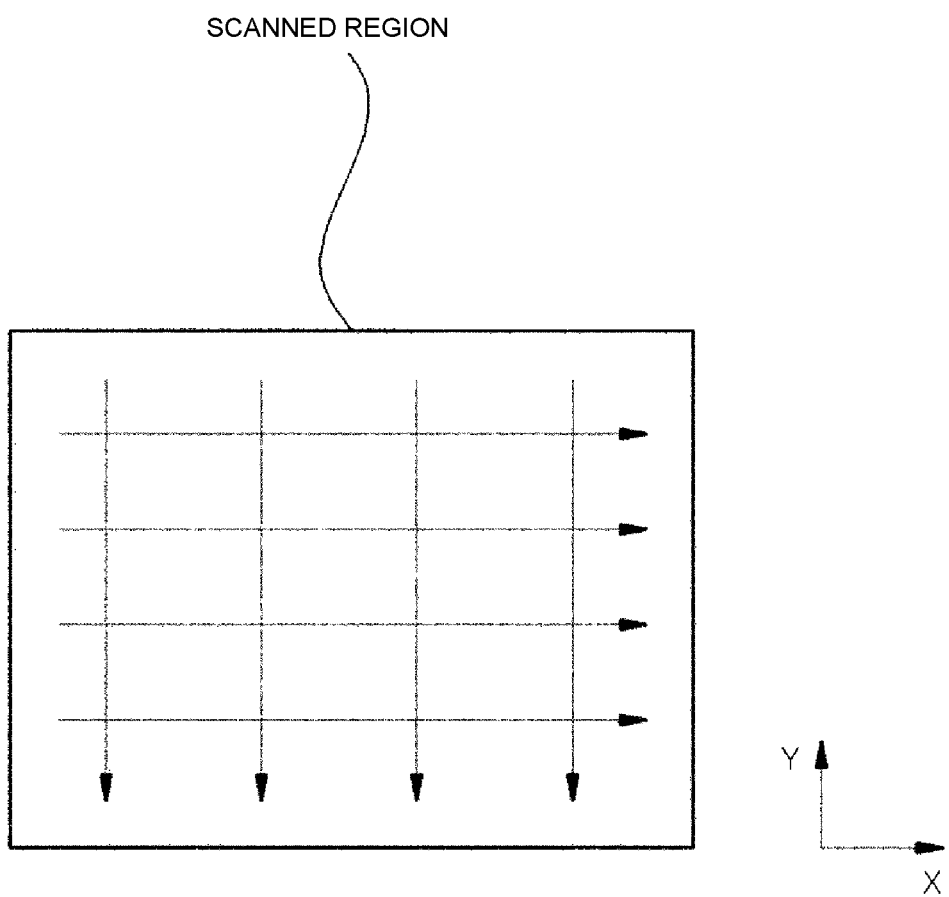
FIG. 10 is a view for describing scanning in the x-axis direction and the y-axis direction due to different voltages applied to the two lenses included in the TOF camera device.

Referring to FIGS. 8 to 10, different voltages may be applied to the two lenses included in the TOF camera device to scan a region including an object. For example, a predetermined voltage may be applied to one lens to refract light to enable scanning in the x-axis direction. Also, a different voltage may be applied to the remaining lens to refract light to enable scanning in the y-axis direction.

Meanwhile, a range of a scanned region may also be adjusted using voltages applied to the two lenses included in the TOF camera device. For example, a lower voltage may be applied to a lens for a region to be scanned, i.e., a region including the object, that is narrower, and a higher voltage may be applied to the lens for a region to be scanned that is wider. The shape of the polymer may be deformed to a smaller extent due to a lower voltage applied to the lens such that light may be refracted in a narrow range, and the shape of the polymer may be deformed to a larger extent due to a higher voltage is applied to the lens such that light may be refracted in a wide range.

Although the present disclosure has been described with reference to the exemplary embodiment of the present disclosure, those of ordinary skill in the art should understand that the present disclosure may be modified and changed in various ways within the scope not departing from the spirit and area of the present disclosure described in the claims below.

The invention claimed is:
1. A camera device comprising:
   a light supplier configured to output IR (infrared) light;
   a light receiver including a plurality of pixels each having
      a first receiving unit and a second receiving unit and configured to be input with light output from the light supplier and then reflected from an object;

a calculator configured to calculate a distance from the object using a difference in amounts of light input to the first receiving unit and the second receiving unit of the light receiver;

a first lens configured to refract light output from the light supplier in a first direction;

a second lens configured to refract light output from the light supplier in a second direction, which are disposed between the light supplier and the object; and a light transmission member arranged between the light supplier and the first lens to transmit light output from the light supplier to the first lens.

2. The camera device of claim 1, further comprising a power source configured to apply a voltage to the first lens and the second lens.

3. The camera device of claim 2, wherein different voltages are applied to the first lens and the second lens.

4. The camera device of claim 3, wherein at least one of the first lens and the second lens includes a glass substrate, a polymer arranged on the glass substrate, a glass film arranged on the polymer, and a piezoelectric element arranged on the glass film.

5. The camera device of claim 4, wherein the power source is connected to the piezoelectric element.

6. The camera device of claim 5, wherein the shape of the polymer changes according to a voltage applied to the piezoelectric element, and at least one of a refractive index and a refracting direction of a lens changes according to the shape of the polymer.

7. The camera device of claim 1, wherein the first direction and the second direction form an angle of 90°.

8. The camera device of claim 1, wherein the first receiving unit is activated while a light source is turned on, and the second receiving unit is activated while the light source is turned off.

9. A camera device comprising:

a light supplier configured to output IR (infrared) light;

a light receiver configured to be input with light output from the light supplier and then reflected from an object; and calculator configured to calculate a distance from the object using an amount of light input into the light receiver, wherein the camera device further includes a plurality of lenses sequentially arranged between the light supplier and the object; and wherein refracting directions of the plurality of lenses are adjusted to be different from each other according to a voltage applied to each of the plurality of lens, and wherein a first refracting direction of a first lens of the plurality of lenses and a second refracting direction of a second lens of the plurality of lenses form an angle of 90°.

10. The camera device of claim 9, wherein the plurality of lenses include a tunable lens.

11. The camera device of claim 9, wherein the plurality of lenses are fixed at predetermined intervals in a lens holder.

12. The camera device of claim 1, wherein the light transmission member is a condensing lens.

13. The camera device of claim 1, wherein the light supplier comprises a light source and a light converter.

* * * * *